United States Patent
Shin et al.

(10) Patent No.: US 8,976,892 B2
(45) Date of Patent: Mar. 10, 2015

(54) BEAMFORMING METHOD AND APPARATUS USING A RATE SPLITTING SCHEME IN A MULTI-CELL MULTI-ANTENNA INTERFERENCE CHANNEL

(75) Inventors: Won Jae Shin, Yongin-si (KR); Hyun Ho Choi, Suwon-si (KR); Nam Yoon Lee, Seoul (KR); Won Jong Noh, Yongin-si (KR); Chang Yong Shin, Seoul (KR); Kyung Hun Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 607 days.

(21) Appl. No.: 12/909,997

(22) Filed: Oct. 22, 2010

(65) Prior Publication Data
US 2011/0235750 A1 Sep. 29, 2011

(30) Foreign Application Priority Data
Mar. 23, 2010 (KR) .................. 10-2010-0025819

(51) Int. Cl.
H04K 1/02 (2006.01)
H04B 7/06 (2006.01)
H04B 7/04 (2006.01)

(52) U.S. Cl.
CPC ............ *H04B 7/0617* (2013.01); *H04B 7/0434* (2013.01); *H04B 7/0452* (2013.01)
USPC ...................................................... 375/296

(58) Field of Classification Search
None
See application file for complete search history.

(56) References Cited

U.S. PATENT DOCUMENTS

| | | | |
|---|---|---|---|
| 8,374,650 B2* | 2/2013 | Kotecha et al. | 455/561 |
| 2006/0203891 A1 | 9/2006 | Sampath et al. | |
| 2007/0077934 A1 | 4/2007 | Chindapol et al. | |
| 2009/0047901 A1* | 2/2009 | Yu et al. | 455/7 |
| 2009/0158120 A1* | 6/2009 | Palanki et al. | 714/758 |
| 2009/0262719 A1 | 10/2009 | Shim et al. | |
| 2010/0041409 A1* | 2/2010 | Kim et al. | 455/450 |

FOREIGN PATENT DOCUMENTS

| | | |
|---|---|---|
| EP | 1 931 089 A2 | 6/2008 |
| JP | 2005-110257 | 4/2005 |
| KR | 10-2004-0035183 | 4/2004 |
| KR | 10-0758183 | 9/2007 |
| WO | WO 2007/029965 A1 | 3/2007 |
| WO | WO 2008/039012 A1 | 4/2008 |
| WO | WO 2010/017482 A1 | 2/2010 |

OTHER PUBLICATIONS

"Collaborative MIMO for LTE-A downlink", 3GPP SG RAN WG1 Meeting #53bis, Jun. 30, 2008, 6pp, R1-082501, Warsaw, Poland.
"Downlink MIMO for EUTRA", 3GPP TSG RAN WG1 Meeting #44, Feb. 13, 2006, 10pp, R1-060335, Denver, USA.
Extended European Search Report Issued Oct. 17, 2011, in counterpart European Application No. 11151254.7, 11pp.

(Continued)

*Primary Examiner* — Kouroush Mohebbi
(74) *Attorney, Agent, or Firm* — NSIP Law

(57) ABSTRACT

A beamforming method and apparatus for using a rate splitting scheme in a multi-cell multi-antenna system, are provided. The multi-cell multi-antenna system determines transmission and reception beamforming vectors, thereby being divided into a plurality of pairs of single input and single output (SISO) interference channels. A rate splitting scheme may be applied to each of the plurality of pairs.

21 Claims, 7 Drawing Sheets

(56) References Cited

OTHER PUBLICATIONS

Hardjawana, Wibowo, et al., "Spectrally Efficient Wireless Systems with Cooperative Precoding and Beamforming", IEEE Transactions on Wireless Communications, Dec. 2009, pp. 5871-5883, vol. 8, No. 12.

Heo, Joo, et al., "A Novel Transmit Power Allocation Algorithm Combined with Dynamic Channel Allocation in Reuse Partitioning-based OFDMA/FDD System", Proceedings of the IEEE International Conference on Communications (ICC '06, Istanbul), Jun. 2006, pp. 5654-5659.

* cited by examiner

BEAMFORMING METHOD AND APPARATUS USING A RATE SPLITTING SCHEME IN A MULTI-CELL MULTI-ANTENNA INTERFERENCE CHANNEL

CROSS-REFERENCE TO RELATED APPLICATION(S)

This application claims the benefit under 35 U.S.C. §119 (a) of Korean Patent Application No. 10-2010-0025819, filed on Mar. 23, 2010, in the Korean Intellectual Property Office, the entire disclosure of which is incorporated herein by reference for all purposes.

BACKGROUND

1. Field

The following description relates to a communication method in a multi-cell multi-antenna system, and more particularly, to a communication method to control inter-cell interference.

2. Description of Related Art

Mobile communication systems often use a high carrier frequency to obtain a sufficient amount of frequency resources. In doing so the coverage of the cell may decrease. To compensate for the decrease in cell coverage, various attempts at compensation have been performed, such as decreasing the distance between cells, increasing the transmission power, and the like. However, the attempts at compensation may cause a user located at an edge of a cell to experience a large amount of interference from one or more adjacent cells.

SUMMARY

In one general aspect, there is provided a target transmitter corresponding to a target receiver, the target transmitter comprising: a rate splitting encoder configured to encode a first stream and a second stream for transmission to the target receiver according to a rate splitting scheme; and a transmission beamforming unit configured to: use transmission beamforming vectors to align the first stream and a third stream in a first reception spatial dimension of the target receiver; and align the second stream and a fourth stream in a second reception spatial dimension of the target receiver, wherein the third stream and the fourth stream comprise streams transmitted by a neighbor transmitter of the target transmitter.

The target transmitter may further include that the transmission beamforming vectors are generated based on: channel information between the target transmitter and the target receiver; and channel information between the target transmitter and a neighbor receiver.

The target transmitter may further include that the transmission beamforming vectors are generated based on: reception beamforming vectors of the target receiver; and reception beamforming vectors of a neighbor receiver.

The target transmitter may further include that the reception beamforming vectors of the target receiver are linearly independent from the reception beamforming vectors of the neighbor receiver.

The target transmitter may further include a transmission beamforming vector generating unit configured to generate transmission beamforming vectors for the first stream and the second stream.

The target transmitter may further include that the rate splitting encoder is further configured to encode the first stream and the second stream to enable a neighbor receiver corresponding to the neighbor transmitter to decode: a common message of the first stream received in a first reception spatial dimension of the neighbor receiver; and a common message of the second stream received in a second reception spatial dimension of the neighbor receiver.

In another general aspect, there is provided a target transmitter corresponding to a target receiver, the target transmitter comprising: a rate splitting encoder configured to encode a plurality of streams for transmission to the target receiver according to a rate splitting scheme; and a transmission beamforming unit configured to: use coordinated beamforming vectors as transmission beamforming vectors for N-M streams, the coordinated beamforming vectors enabling each individual stream of the N-M streams of the target transmitter to be decoded in different spatial dimension out of N-M spatial dimensions of the target receiver; and use transmission beamforming vectors for S-(N-M) streams to respectively align, in one of S-(N-M) spatial dimensions of the target receiver, one of remaining S (N-M) streams of the target transmitter and one of streams of a neighbor transmitter, the streams of the neighbor transmitter corresponding to the remaining S-(N-M) streams of the target transmitter, when N is greater than M and less than N_req, wherein S is the number of streams, N is the number of antennas of the target transmitter, M is the number of antennas of the target receiver, and N_req is the multiplication of M and the total number of receivers.

In another general aspect, there is provided a target receiver corresponding to a target transmitter, the target receiver comprising: a reception beamforming unit configured to use reception beamforming vectors to: remove, in a first reception spatial dimension, components associated with a second stream and a fourth stream included in a signal received by the target receiver; and remove, in a second reception spatial dimension, components associated with a first stream and a third stream included in the signal received by the target receiver, the first stream and the second stream being transmitted by the target transmitter, the third stream and the fourth stream being transmitted by a neighbor transmitter of the target transmitter; and a rate splitting decoder configured to: decode the first stream by removing a decodable common message of the third stream from the signal from which the components associated with the second stream and the fourth stream are removed; and decode the second stream by removing a decodable common message of the fourth stream from the signal from which the components associated with the first stream and the third stream are removed.

The target receiver may further include that the beamforming vectors are generated based on: channel information between the target transmitter and the neighbor transmitter; and channel information between the target transmitter and the target receiver.

The target receiver may further include that the reception beamforming vectors are generated based on: transmission beamforming vectors of the target transmitter; and transmission beamforming vectors of the neighbor transmitter.

The target receiver may further include that the reception beamforming vectors are linearly independent.

The target receiver may further include that the rate splitting decoder is further configured to: decode the decodable common message of the third stream to remove the decodable common message of the third stream; and decode the decodable common message of the fourth stream to remove the decodable common message of the fourth stream.

In another general aspect, there is provided a transmitting method of a target transmitter corresponding to a target receiver, the method comprising: encoding a first stream and a second stream for transmission to the target receiver according to a rate splitting scheme; and using transmission beamforming vectors to align the first stream, as interference, in a second reception spatial dimension of the target receiver and in a second reception spatial dimension of a neighbor receiver, and to align the second stream, as interference, in a first reception spatial dimension of the target receiver and in the first reception spatial dimension of the neighbor receiver.

The method may further include that the transmission beamforming vectors are generated based on: channel information between the target transmitter and the target receiver; and channel information between the target transmitter and the neighbor receiver.

The method may further include that the transmission beamforming vectors are generated based on: reception beamforming vectors of the target receiver; and reception beamforming vectors of the neighbor receiver.

In another general aspect, there is provided a method of allocating a frequency resource for a multi-cell communication system comprising a first cell, a second cell, and a third cell, the method comprising: allocating the same inner frequency resource to inner-cells of: the first cell; the second cell; and the third cell; and allocating: a first frequency resource to an outer-cell of the first cell; a second frequency resource to an outer-cell of the second cell; and a third frequency resource to an outer cell of the third cell, wherein the first frequency resource, the second frequency resource, and the third frequency resource partially overlap each other.

In another general aspect, there is provided a computer-readable storage medium having stored therein program instructions to cause a processor to execute method of a target transmitter corresponding to a target receiver, the method comprising: encoding a first stream and a second stream for transmission to the target receiver according to a rate splitting scheme; and using transmission beamforming vectors to align the first stream, as interference, in a second reception spatial dimension of the target receiver and in a second reception spatial dimension of a neighbor receiver, and to align the second stream, as interference, in a first reception spatial dimension of the target receiver and in the first reception spatial dimension of the neighbor receiver.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
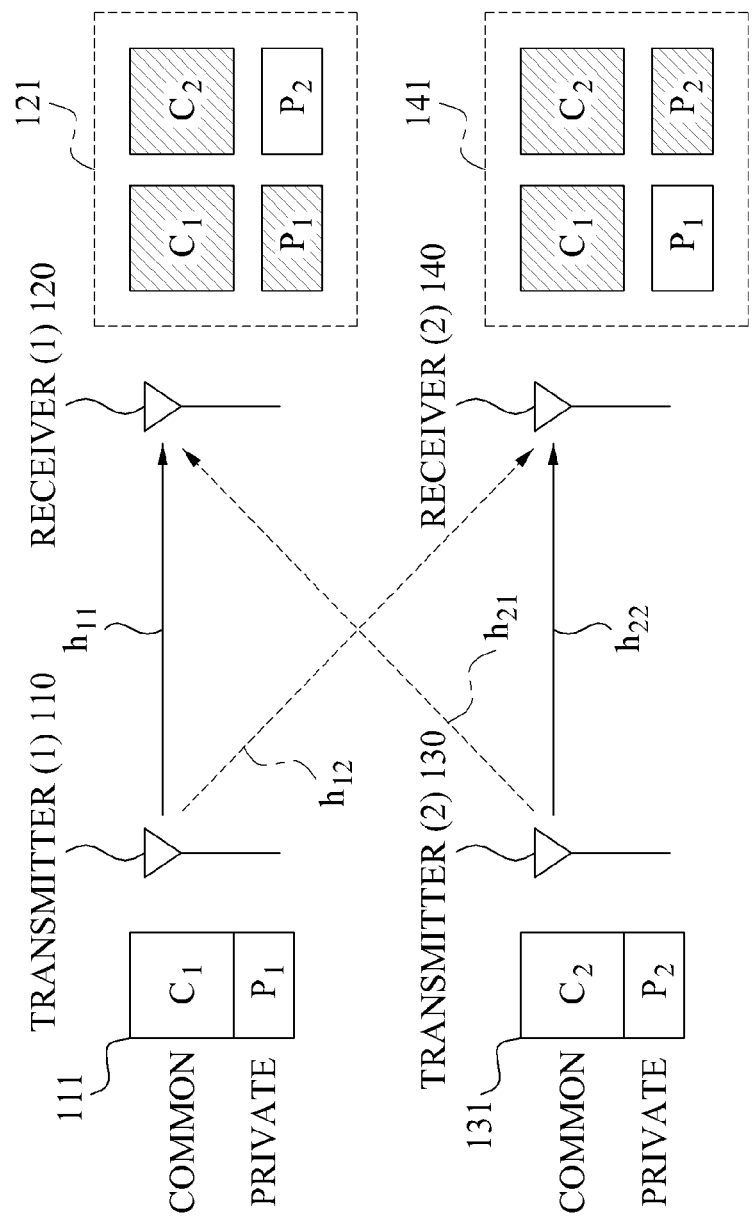
FIG. 1 is a diagram illustrating an example of a communication system that applies a rate splitting scheme to a single transmission and a single reception antenna interference channel.

FIG. 1 illustrates an example of a communication system that applies a rate splitting scheme to a single transmission and a single reception antenna interference channel.

Referring to FIG. 1, the communication system includes a transmitter (1) 110, a receiver (1) 120, a transmitter (2) 130, and a receiver (2) 140.

According to the rate splitting scheme, the transmitter (1) 110 and the transmitter (2) 130 may separate a message to be transmitted into a common message and a private message. The transmitter may transmit the common message and the private message to a receiver. In this example, message features such as an amplitude of the common message and the private message, a rate of the common message and the private message, and the like, may be adaptively adjusted based on channels between the transmitter (1) 110, the transmitter (2) 130, the receiver (1) 120, and the receiver (2) 140. For example, the messages features may be adjusted based on the strength of the signal channels and the strength of the interference channels.

As described herein, the common message may be decodable by both a corresponding receiver and one or more neighboring receivers.

For example, the rate or the transmission power of the common message of the transmitter (1) 110 may be adjusted such that both the receiver transmitter (1) 120 and the receiver (2) 140 may decode the common message. In this example, the receiver (2) 140 may decode the common message of the transmitter (1) 110 and may remove, from a received signal, a component corresponding to the common message of the transmitter (1) 110. The common message of the transmitter (1) 110 may be interference to the receiver (2) 140. Accordingly, the receiver (2) 140 may remove the interference thereby improving the reception quality of the receiver (2) 140.

Conversely, the private message may be decoded by the corresponding receiver, and may not be decoded by the neighbor receiver.

For example, a rate or a transmission power of a private message of the transmitter (1) 110 may be adjusted such that the private message may be decoded by the receiver (1) 120 and may not be decoded by the receiver (2) 140. In this example, the private message of the transmitter (1) 110 may cause interference to the receiver (2) 140, and the receiver (2) 140 may include the interference while performing decoding.

Based on the rate splitting scheme, receivers may partially remove interference and may improve a signal-to-interference plus noise ratio (SINR) or a transmission rate.

The transmitter (1) 110 may separate a message 111 to be transmitted into a common message ($C_1$) and a private message ($P_1$), and may transmit the messages $C_1$ and $P_1$. Similarly, the transmitter (2) 130 may separate a message 131 into a common message ($C_2$) and a private message ($P_2$) and may transmit the messages $C_2$ and $P_2$ to the receiver (1) 120 and the receiver (2) 140.

In this example, the receiver (1) 120 may receive the message 111 via a channel $h_{11}$ and may receive the message 131 via a channel $h_{21}$. The receiver (1) 120 may receive messages $C_1, P_1, C_2,$ and $P_2$. Messages $C_2$ and $P_2$ may act as interference to the receiver (1) 120. The receiver (1) 120 may decode $C_1$, $C_2$ and $P_1$ and may remove a component corresponding to $C_2$. Accordingly, only $P_2$ remains in the receiver (1) 120 as interference.

Similarly, the receiver (2) 140 may receive the message 111 via a channel 12 and may receive the message 131 via a channel 22. The receiver (2) 140 may receive messages $C_1$, $P_1$, $C_2$, and $P_2$, where messages $C_1$ and $P_1$ act as interference to the receiver (2) 140. The receiver (2) 140 may decode $C_1$, $C_2$, and $P_2$ and may remove interference due to $C_1$. Accordingly, only $P_1$ may remain in the receiver (2) 140 as interference.

The rate splitting scheme may be applied to a network generally including only two pairs, and each including a transmitter and a receiver in each pair may, wherein each of the transmitter and the receiver include an antenna. When each of the transmitter and the receiver has two or more antennas, for example, in a multi-antenna interference channel, it may be difficult to apply the rate splitting scheme.

Figure 2:
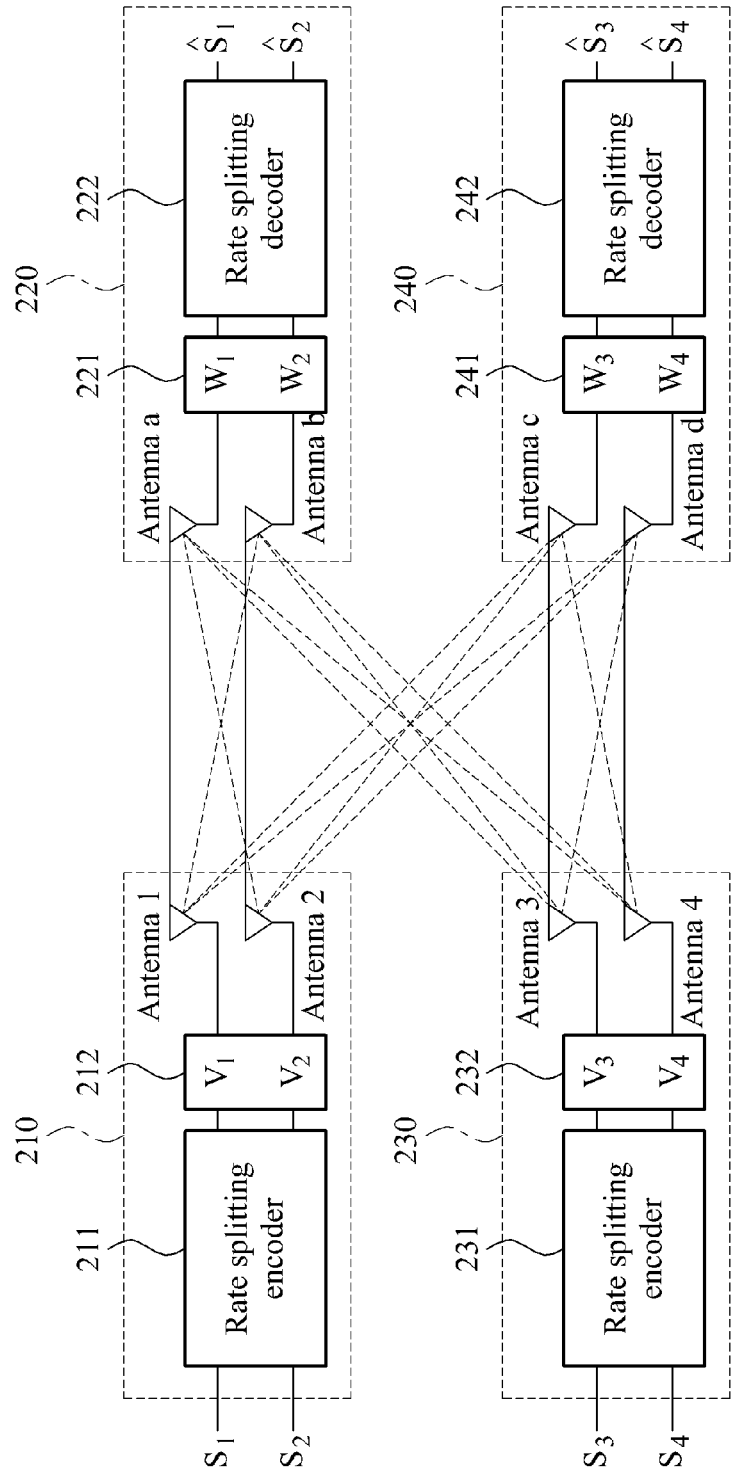
FIG. 2 is a diagram illustrating an example of a beamforming communication system using a rate splitting scheme in a multi-cell multi-antenna interference channel.

FIG. 2 illustrates an example of a beamforming communication system using a rate splitting scheme in a multi-cell multi-antenna interference channel.

Referring to the example shown in FIG. 2, the beamforming communication system includes a first transmitter 210, a first receiver 220 corresponding to the first transmitter 210, a second transmitter 230, and a second receiver 240 corresponding to the second transmitter 230.

The first transmitter 210 and the second transmitter 230 may simultaneously transmit a plurality of streams to the first receiver 220 and the second receiver 240, respectively. In this example, the first transmitter 210 transmits symbols $S_1$ and $S_2$, and the second transmitter 230 transmits symbols $S_3$ and $S_4$. In this example, each of the first transmitter 210, the second transmitter 230, the first receiver 220, and the second receiver 240 includes two antennas. It should be understood though that this is merely for purposes of example, and the first transmitter 210, the second transmitter 230, the first receiver 220, and the second receiver 240 may include more than two antennas, for example, three antennas, four antennas, or more.

In this example, the first transmitter 210 includes a rate splitting encoder 211, a transmission beamforming unit 212, an antenna 1, and an antenna 2. The second transmitter 230 includes a rate splitting encoder 231, a transmission beamforming unit 232, an antenna 3, and an antenna 4. The first receiver 220 includes an antenna a, an antenna b, a reception beamforming unit 221, and a rate splitting decoder 222. The second receiver 240 includes an antenna c, an antenna d, a reception beamforming unit 241, and a rate splitting decoder 242.

The rate splitting encoder 231 of the first transmitter 210 may encode a first stream and a second stream for the first receiver 220, according to the rate splitting scheme.

Each of a first transmitter 210 and a second transmitter 230 may transmit two signals. Signals may be transmitted by the antenna of the transmitters and received by the antennas of the receivers. Each of the transmitted signals may be expressed as shown in Equation 1.

$$x_i = \sqrt{p_i} v_i s_i \quad \text{[Equation 1]}$$

In Equation 1, $s_i$ corresponds to a symbol to be transmitted by the first transmitter 210 or the second transmitter 230, and i corresponds to an index of a stream. $v_i$ corresponds to a transmission beamforming vector. The transmission beamforming vector is a unit vector, and $\|v_i\|^2 = 1$. $p_i$ corresponds to a transmission power of $s_i$.

A received signal y1 of the first receiver 220 and a received signal y2 of the second receiver 240 may be expressed as shown in Equation 2.

$$y_1 = H_{11} V_1 s_1 + H_{11} V_1 s_2 + H_{12} V_3 s_3 + H_{12} V_4 s_4 + n_1$$

$$y_2 = H_{22} V_3 s_3 + H_{22} V_4 s_4 + H_{21} V_1 s_1 + H_{21} V_2 s_2 + n_2 \quad \text{[Equation 2]}$$

In Equation 2, $H_{j,i}$ corresponds to a channel matrix from an $i^{th}$ transmitter to $j^{th}$ receiver, and $n_j$ corresponds to an Additive White Gaussian Noise (AWGN) of the $j^{th}$ receiver. The $j^{th}$ receiver may obtain an effective signal by multiplying $y_j$ by a reception beamforming vector $w^H_j$.

When at least three streams flow from a signal dimension or a spatial dimension of the first receiver 220 or the second receiver 240, without being aligned, it may be difficult to apply the rate splitting scheme. For example, when the number of streams that flow from the signal dimension or the spatial dimension of the first receiver 220 or the second receiver 240 is limited to two or less, the rate splitting scheme may be applied.

To apply the rate splitting scheme, symbols $S_1$ and $S_3$ may be aligned in one of two spatial dimensions of the first receiver 220, and symbols $S_2$ and $S_4$ transmitted via different channels may be aligned in the other dimension of the first receiver 220. The symbols $S_1$ and $S_3$ may be aligned in one of two spatial dimensions of the second receiver 240, and the symbols $S_2$ and $S_4$ may be aligned in the other dimension of the second receiver 240.

For example, symbol $S_1$ may be aligned in a second reception spatial dimension of the first receiver 220 and may be aligned in a second reception spatial dimension of the second receiver 240, as interference. Symbol $S_2$ may be aligned in a first reception spatial dimension of the first receiver 220 and may be aligned in a first reception spatial dimension of the second receiver 240 as interference. Symbol $S_3$ may be aligned in the second reception spatial dimension of the first receiver 220 and may be aligned in the second reception spatial dimension of the second receiver 240, as interference. Symbol $S_4$ may be aligned in the first reception spatial dimension of the first receiver 220, and may be aligned in the first spatial dimension of the second receiver 240, as interference. For the alignment of symbols $S_1, S_2, S_3,$ and $S_4$, the following condition as shown in Equation 3 may be used.

$$\text{span}(w_1) = \text{span}[H_{11} v_1 H_{12} v_3]$$

$$\text{span}(w_2) = \text{span}[H_{11} v_2 H_{12} v_4]$$

$$\text{span}(w_3) = \text{span}[H_{22} v_3 H_{21} v_1]$$

$$\text{span}(w_4) = \text{span}[H_{22} v_4 H_{21} v_2] \quad \text{[Equation 3]}$$

Transmission beamforming vectors $V_1$, $V_2$, $V_3$ and $V_4$ and reception beamforming vectors $W_1$, $W_2$, $W_3$, and $W_4$ are unit vectors. Accordingly, a condition as shown in Equation 4 may be additionally used.

$$\|w_i\|^2=1, i=1,\ldots,4$$

$$\|v_i\|^2=1, i=1,\ldots,4 \quad \text{[Equation 4]}$$

Reception beamforming vectors $W_1$ and $W_2$ may exist in different spaces. Accordingly, a condition where vectors $W_1$ and $W_2$ are linearly independent may be used as shown in Equation 5. Reception beamforming vectors $W_3$ and $W_4$ may also use the same condition.

$$\text{rank}[w_1 w_2]=2$$

$$\text{rank}[w_3 w_4]=2 \quad \text{[Equation 5]}$$

A decoding condition of the first receiver 220 and the second receiver 240 expressed in Equation 5 may be rewritten as the condition shown in Equation 6.

$$r_1 = c_1 w_1 + c_2 w_2$$

$$r_2 = c_3 w_3 + c_4 w_4 \quad \text{[Equation 6]}$$

In Equation 6, $r_i$ corresponds to a 2×1 random column vector, and $c_i$ corresponds to a complex parameter.

When reception beamforming vectors $W_1$ and $W_2$ are linearly independent, a linear sum of $W_1$ and $W_2$ may indicate a random vector $r_1$, and Equation 5 and Equation 6 may be regarded to be the same. Accordingly, constants $c_1$ and $c_2$ satisfying a condition of $r_1 = c_1 w_1 + c_2 w_2$ may be obtained.

To generate a transmission beamforming vector and a reception beamforming vector simultaneously satisfying conditions, a unified system equation including the conditions may be expressed as shown in Equation 7. The conditions may include, for example, an interference alignment condition and a condition enabling the first receiver 220 and the second receiver 240 to decode a desired signal, $$\begin{bmatrix} \alpha_1 I_N & 0_{N\times N} & 0_{N\times N} & 0_{N\times N} & -H_{11} & 0_{N\times M} & 0_{N\times M} & 0_{N\times M} \\ \alpha_2 I_N & 0_{N\times N} & 0_{N\times N} & 0_{N\times N} & 0_{N\times M} & 0_{N\times M} & -H_{12} & 0_{N\times M} \\ 0_{N\times N} & \alpha_3 I_N & 0_{N\times N} & 0_{N\times N} & 0_{N\times M} & -H_{11} & 0_{N\times M} & 0_{N\times M} \\ 0_{N\times N} & \alpha_4 I_N & 0_{N\times N} & 0_{N\times N} & 0_{N\times M} & 0_{N\times M} & 0_{N\times M} & -H_{12} \\ 0_{N\times N} & 0_{N\times N} & \alpha_5 I_N & 0_{N\times N} & -H_{21} & 0_{N\times M} & 0_{N\times M} & 0_{N\times M} \\ 0_{N\times N} & 0_{N\times N} & \alpha_6 I_N & 0_{N\times N} & 0_{N\times M} & 0_{N\times M} & -H_{22} & 0_{N\times M} \\ 0_{N\times N} & 0_{N\times N} & 0_{N\times N} & \alpha_7 I_N & 0_{N\times M} & -H_{21} & 0_{N\times M} & 0_{N\times M} \\ 0_{N\times N} & 0_{N\times N} & 0_{N\times N} & \alpha_8 I_N & 0_{N\times M} & 0_{N\times M} & 0_{N\times M} & -H_{22} \\ c_1 I_N & c_2 I_N & 0_{N\times N} & 0_{N\times N} & 0_{N\times M} & 0_{N\times M} & 0_{N\times M} & 0_{N\times M} \\ 0_{N\times N} & 0_{N\times N} & c_3 I_N & c_4 I_N & 0_{N\times M} & 0_{N\times M} & 0_{N\times M} & 0_{N\times M} \\ w_1^H & 0_{1\times N} & 0_{1\times N} & 0_{1\times N} & 0_{1\times M} & 0_{1\times M} & 0_{1\times M} & 0_{1\times M} \\ 0_{1\times N} & w_2^H & 0_{1\times N} & 0_{1\times N} & 0_{1\times M} & 0_{1\times M} & 0_{1\times M} & 0_{1\times M} \\ 0_{1\times N} & 0_{1\times N} & w_3^H & 0_{1\times N} & 0_{1\times M} & 0_{1\times M} & 0_{1\times M} & 0_{1\times M} \\ 0_{1\times N} & 0_{1\times N} & 0_{1\times N} & w_4^H & 0_{1\times M} & 0_{1\times M} & 0_{1\times M} & 0_{1\times M} \\ 0_{1\times N} & 0_{1\times N} & 0_{1\times N} & 0_{1\times N} & v_1^H & 0_{1\times M} & 0_{1\times M} & 0_{1\times M} \\ 0_{1\times N} & 0_{1\times N} & 0_{1\times N} & 0_{1\times N} & 0_{1\times M} & v_2^H & 0_{1\times M} & 0_{1\times M} \\ 0_{1\times N} & 0_{1\times N} & 0_{1\times N} & 0_{1\times N} & 0_{1\times M} & 0_{1\times M} & v_3^H & 0_{1\times M} \\ 0_{1\times N} & 0_{1\times N} & 0_{1\times N} & 0_{1\times N} & 0_{1\times M} & 0_{1\times M} & 0_{1\times M} & v_4^H \end{bmatrix} \begin{bmatrix} w_1 \\ w_2 \\ w_3 \\ w_4 \\ v_1 \\ v_2 \\ v_3 \\ v_4 \end{bmatrix} = \begin{bmatrix} 0 \\ 0 \\ 0 \\ 0 \\ 0 \\ 0 \\ 0 \\ 0 \\ r_1 \\ r_2 \\ 1 \\ 1 \\ 1 \\ 1 \\ 1 \\ 1 \\ 1 \\ 1 \end{bmatrix} \quad \text{[Equation 7]}$$

In Equation 7, $\alpha_k$ (k=1, 2, ..., 8) corresponds to a constant. M corresponds to the number of antennas of each transmitter, N corresponds to the number of antennas of each receiver, and K corresponds to the number of transmitters. Equation 7 is a general nonlinear multiple simultaneous equation. When M is 2, N is 2, and K is 2, the total number of equations may be (N*(N*K)+K)*N+K*N*N=28, and the total number of unknown quantities may be 4*N+4*M+8+4=20+4M=28.

Therefore, Equation 7 may have at least one value that exists according to Bezout's theory. Accordingly, the value of Equation 7, for example, $V_1$, $V_2$, $V_3$, and $V_4$ and $W_1$, $W_2$, $W_3$, and $W_4$ may be generally obtained based on a Newton's method.

Figure 3:
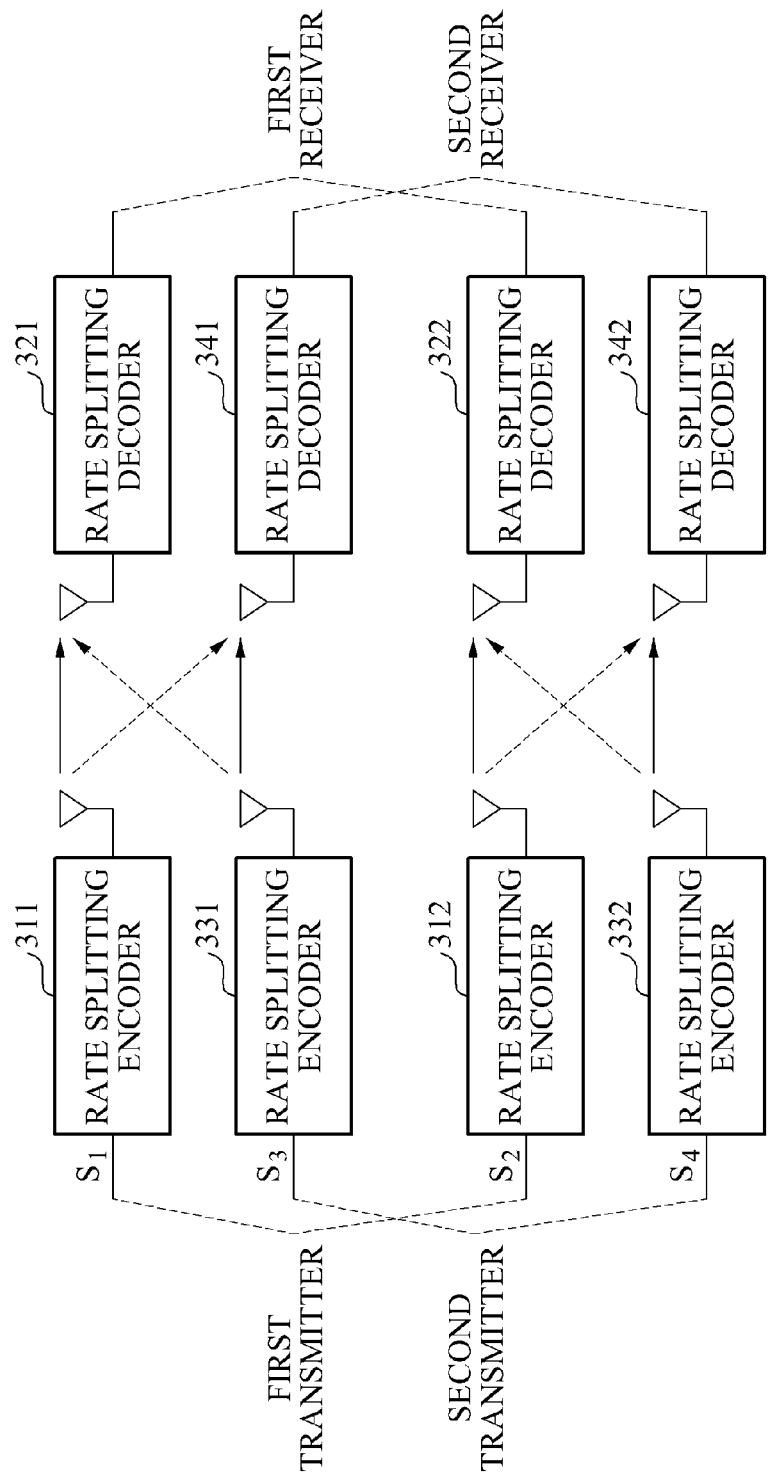
FIG. 3 is a diagram illustrating an example of coordinated beamforming performed by a multi-cell multi-antenna communication system.

FIG. 3 illustrates an example of coordinated beamforming performed by the multi-cell multi-antenna communication system.

When transmission beamforming and reception beamforming are performed based on Equation 7, two single-input single-output (SISO) interference channels may be generated as illustrated in FIG. 3.

FIG. 3 illustrates rate splitting encoders 311 and 312 of a first transmitter, rate splitting encoder 331 and 332 of a second transmitter, rate splitting decoders 321 and 322 of a first receiver, and rate splitting decoders 341 and 342 of a second receiver.

The rate splitting encoder 311 of the first transmitter and the rate splitting encoder 332 of the second transmitter may be established after transmission and reception beamforming is performed. For example, the rate splitting encoder 311 of the first transmitter may correspond to the rate splitting decoder 321 of the first receiver, and the rate splitting encoder 331 of the second transmitter may correspond to the rate splitting decoder 341 of the second receiver.

The rate splitting encoder 312 of the first transmitter and the rate splitting encoder 322 of the second transmitter may correspond to the rate splitting decoder 322 of the first receiver and the rate splitting decoder 342 of the second receiver. The two streams of different transmitters or receivers may be established, and thus, a rate splitting scheme may be applied.

The rate splitting decoder 321 of the first receiver may receive symbols $S_1$ and $S_3$, and may decode symbol $S_1$ and a common message of symbol $S_3$. Accordingly, interference from the common message of $S_3$ may be removed, and a component corresponding to a private message of $S_3$ may remain as interference. The rate splitting decoder 341 of the second receiver may receive symbols $S_1$ and $S_3$, and may decode symbol $S_3$ and a common message of symbol $S_1$. Accordingly, interference due to the common message of $S_1$ may be removed and a component corresponding to a private message of $S_1$ may remain as interference. Similarly, interference in a pair of $S_2$ and $S_4$ may be reduced.

Therefore, the rate splitting scheme may be used after the transmission beamforming and the reception beamforming are performed.

Figure 4:
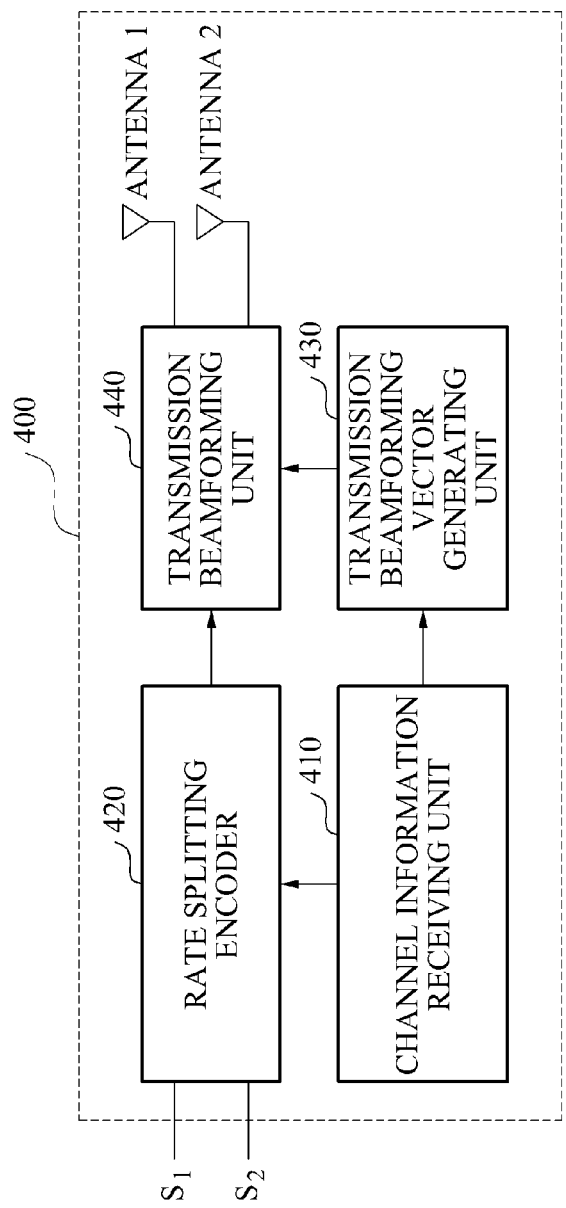
FIG. 4 is a diagram illustrating a first transmitter of a beamforming communication system using a rate splitting scheme in a multi-cell multi-antenna interference channel.

FIG. 4 illustrates a first transmitter of a beamforming communication system using a rate splitting scheme in a multi-cell multi-antenna interference channel.

Referring to FIG. 4, the first transmitter includes a channel information receiving unit 410, a rate splitting encoder 420, a transmission beamforming vector generating unit 430, and a transmission beamforming unit 440.

The rate splitting encoder 420 may encode symbols $S_1$ and $S_2$, for example, streams to be received by a first receiver, based on the rate splitting scheme.

The rate splitting encoder 420 may receive, from the channel information receiving unit 410, channel information including amplitude of a signal and amplitude of interference.

The transmission beamforming unit 440 may perform transmission beamforming to align $S_1$ as interference in a second reception spatial dimension of the first receiver and in a second reception spatial dimension of the second receiver, and to align $S_2$ as interference in a first reception spatial dimension of the first receiver and in a first reception spatial dimension of the second receiver.

The transmission beamforming unit 440 may perform beamforming based on channel information between the first transmitter and the first receiver and/or channel information between the first transmitter and the second receiver. The transmission beamforming unit 440 may perform beamforming based on channel information between the second transmitter and the first receiver and/or channel information between the second transmitter and the second receiver. The transmission beamforming vector generating unit 430 may generate a transmission beamforming vector based on the channel information.

The transmission beamforming vector generating unit 430 may receive channel information from the channel information receiving unit 410. The transmission beamforming vector generating unit 430 may generate transmission beamforming vectors based on reception beamforming vectors of the first receiver and reception beamforming vectors of the second receiver which may be linearly independent. The first transmitter may indirectly generate the transmission beamforming vectors, and may receive information associated with the transmission beamforming vectors to perform beamforming.

Figure 5:
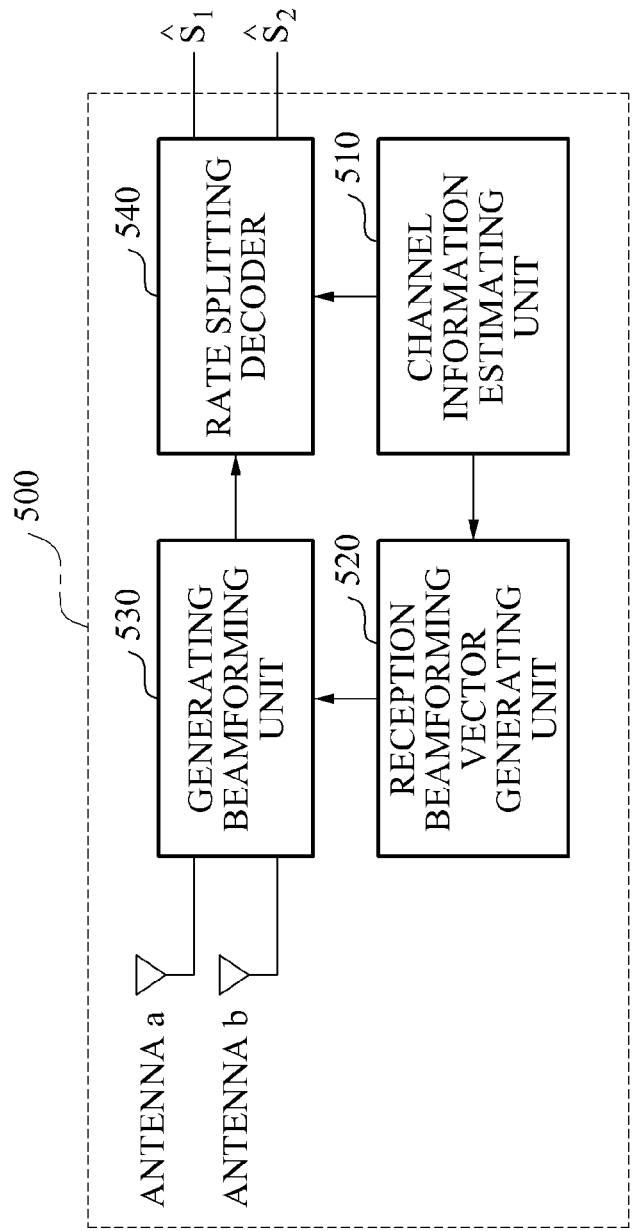
FIG. 5 is a diagram illustrating a first receiver of a beamforming communication system using a rate splitting scheme in a multi-cell multi-antenna interference channel.

FIG. 5 illustrates a first receiver of a beamforming communication system using a rate splitting scheme in the multi-cell multi-antenna interference channel.

Referring to FIG. 5, the first receiver includes an antenna a, an antenna b, a channel information estimating unit 510, a reception beamforming vector generating unit 520, a reception beamforming unit 530, and a rate splitting decoder 540.

In this example, $S_1$ and $S_2$ may be transmitted by a first transmitter corresponding to the first receiver, and $S_3$ and $S_4$ may be transmitted by a second transmitter which is a neighbor transmitter of the first transmitter. The reception beamforming unit 530 may perform beamforming using reception beamforming vectors to remove components associated with $S_2$ and $S_4$ from a signal received by the first receiver in a first reception spatial dimension. The reception beamforming unit 530 may perform beamforming using reception beamforming vectors to remove components associated with $S_1$ and $S_3$ from a signal received by the first receiver, in a second reception spatial dimension.

The reception beamforming unit 530 may perform beamforming based on channel information between the first transmitter and the first receiver and/or based on channel information between second transmitter and the first receiver. The reception beamforming unit 530 may perform beamforming based on channel information between the first transmitter and a second receiver and/or based on channel information between the second transmitter and the second receiver. The channel information may be used when the reception beamforming vector generating unit 520 generates reception beamforming vectors.

The reception beamforming vector generating unit 520 may receive channel information from the channel information estimating unit 510. The reception beamforming vector generating unit 520 may generate the reception beamforming vectors based on reception beamforming vector of the first receiver and reception beamforming vectors of the second receiver which may be linearly independent. The first receiver may indirectly generate the reception beamforming vectors, and may receive information associated with the reception beamforming vectors to perform beamforming.

The rate splitting decoder 540 may decode a common message of symbol $S_3$ from a signal where components associated with symbols $S_2$ and $S_4$ are removed, to obtain $\widehat{S1}$. The rate splitting decoder 540 may decode a common message of symbol $S_4$ from a signal where components associated with symbols $S_1$ and $S_3$ are removed, to obtain $\widehat{S2}$.

Figure 6:
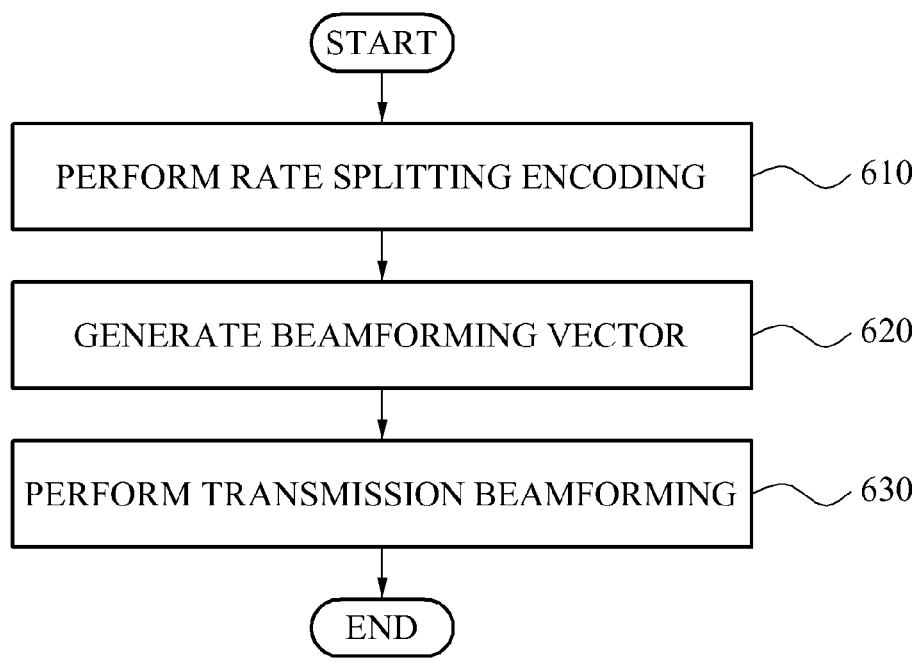
FIG. 6 is a flowchart illustrating an example of a transmission method of a first transmitter that performs beamforming in a multi-cell multi-antenna interference channel.

FIG. 6 illustrates an example of a transmission method of a first transmitter that performs beamforming in a multi-cell multi-antenna interference channel.

Referring to FIG. 6, the first transmitter corresponding to a first receiver encodes symbols $S_1$ and $S_2$ for the first receiver according to the rate splitting scheme in the multi-cell multi-antenna interference channel in operation 610. When symbols $S_1$ and $S_2$ are encoded, encoding may be performed based on channel information between the first transmitter and the first receiver, channel information between the first transmitter and a second receiver, channel information between a second transmitter and the first receiver, and channel information between the second transmitter and the second receiver.

In operation 620, the first transmitter generates a transmission beamforming vector for symbol $S_1$ to align $S_1$ as interference in a second reception spatial dimension of the first receiver and in a second reception spatial dimension of the second receiver that is neighbor receiver of the first receiver. Also, the first transmitter generates a transmission beamforming vector for symbol $S_2$ to align $S_2$ as interference in a first reception spatial dimension of the first receiver and in a first reception spatial dimension of the second receiver. In this example, the transmission beamforming vectors may be generated based on reception beamforming vectors of the first receiver and reception beamforming vectors of the second receiver. Also, the transmission beamforming vector may be generated based on beamforming vectors of the second transmitter that is a neighboring transmitter of the first transmitter.

In operation 630, the first transmitter performs beamforming using transmission beamforming for symbol $S_1$ to align $S_1$ as interference in the second reception spatial dimension of the first receiver and the second reception spatial dimension of the second receiver that is the neighbor receiver of the first receiver. Also, the first transmitter performs beamforming using transmission beamforming for symbol $S_2$ to align $S_2$ as interference in the first reception spatial dimension of the first receiver and in the first reception spatial dimension of the second receiver.

The encoded symbols $S_1$ and $S_2$ may be transmitted to the first receiver and the second receiver through the first transmitter where the beamforming in operation 630 is performed.

In the example of FIG. 6, the number of antennas (N) of the transmitter is 2, the number of antennas (M) of the receiver is 2, and the number of streams (S) transmitted by each transmitter is 2. When N is greater than M and less than N_req, the following method may be applied. N_req corresponds to the minimum number of antennas of transmitters that remove interference based on a coordinated beamforming scheme, and may be defined as a multiplication of M and the number of receivers.

N-M streams of the target transmitter may use coordinated beamforming vectors as transmission beamforming vectors for the N-M streams. The coordinated beamforming vectors enable one of the N-M streams to be decoded in one of the N-M spatial dimensions of the target receiver. The target transmitter may use transmission beamforming vectors for S-(N-M) streams to align, in one of S-(N-M) spatial dimensions of the target receiver, one of remaining S-(N-M) streams of the target transmitter and one of streams of neighbor transmitter corresponding to S-(N-M) streams of the target transmitter. A rate splitting scheme may be applied to a pair of S-(N-M) streams. The coordinated beamforming scheme and an alignment scheme for the rate splitting may be used simultaneously.

For example, the N-M streams may use nulling vectors of an interference channel as transmission beamforming vectors causing nulling to occur. Transmission beamforming vectors may be generated to align one of the remaining streams in one of S-(N-M) spatial dimensions among M independent spatial dimensions of a receiver. The target transmitter may perform beamforming using the beamforming vectors.

When N is greater than or equal to N_req, transmission and reception beamforming vectors for the coordinated beamforming may be generated and may be used to remove interference.

Figure 7:
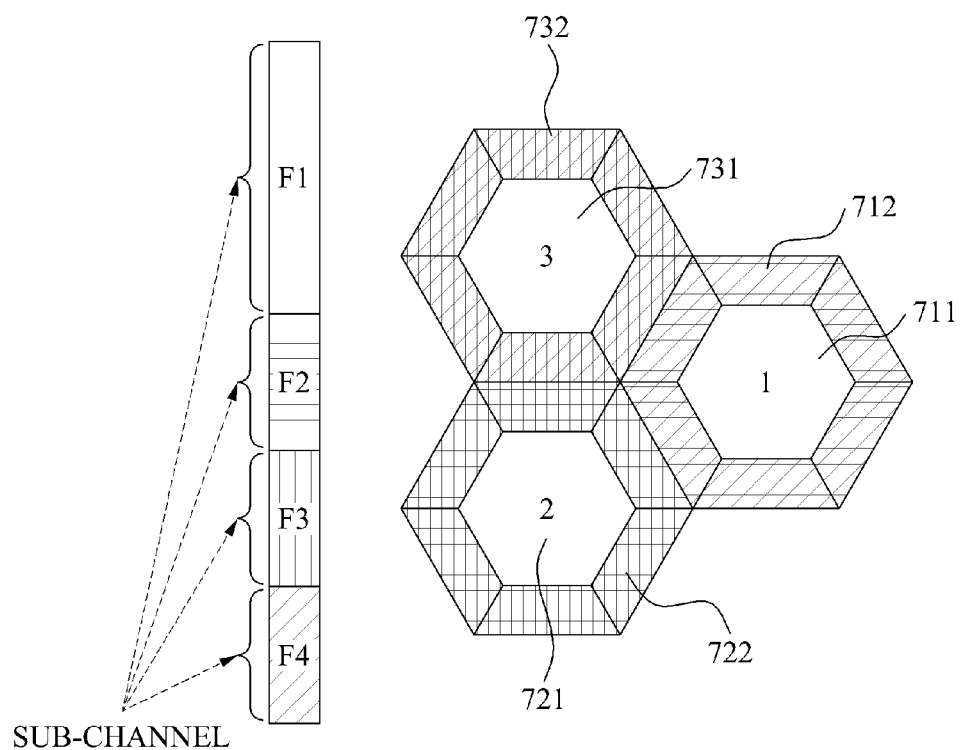
FIG. 7 is a diagram illustrating an example of a process of allocating a frequency to resource for a multi-cell communication system.

FIG. 7 illustrates an example of a process for allocating a frequency resource for a multi-cell communication system.

Referring to FIG. 7, the multi-cell communication system includes a first cell, a second cell, and a third cell.

The same inner frequency resource (F1) may be allocated to inner-cells 711, 721, and 731 of the first cell, the second cell, and third cell.

A first frequency resource (F2+F4) may be allocated to an outer-cell 712 of the first cell, a second frequency resource (F2+F3) may be allocated to an outer-cell 722 of the second cell, and a third frequency resource (F3+F4) may be allocated to an outer cell 732 of the third cell. Accordingly, frequency resources F2+F4, F2+F3, and F3+F4 may partially overlap each other.

When the method of allocating the frequency resource is used, the rate splitting scheme may be applied in the cells by performing appropriate beamforming.

A transmission and reception method performing beamforming using a rate splitting scheme in a multi-cell multi-antenna system according to an embodiment has been described herein. Various embodiments described with reference FIGS. 1 through 5 may be applied, however, for conciseness further description thereof is omitted.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A target transmitter corresponding to a target receiver, comprising:
 a rate splitting encoder configured to encode a first stream and a second stream for transmission by the target transmitter to the target receiver according to a rate splitting scheme; and
 a transmission beamformer configured to:
  use transmission beamforming vectors to align the first stream and a third stream without aligning the second stream and a fourth stream in a first reception spatial dimension of the target receiver, wherein the first stream and the third stream are aligned by applying a span of a first reception beamforming vector; and
  use the transmission beamforming vectors to align the second stream and the fourth stream without aligning the first stream and the third stream in a second reception spatial dimension of the target receiver, wherein the second and fourth stream are aligned by applying a span of a second reception beamforming vector, wherein
  the third stream and the fourth stream are transmitted by a neighbor transmitter of the target transmitter.

2. The target transmitter of claim 1, wherein the transmission beamforming vectors are generated based on:
 channel information between the target transmitter and the target receiver; and
 channel information between the target transmitter and the neighbor receiver.

3. The target transmitter of claim 1, wherein the transmission beamforming vectors are generated based on:
 reception beamforming vectors of the target receiver; and
 reception beamforming vectors of the neighbor receiver.

4. The target transmitter of claim 3, wherein the reception beamforming vectors of the target receiver are linearly independent from the reception beamforming vectors of the neighbor receiver.

5. The target transmitter of claim 1, further comprising a transmission beamforming vector generator configured to generate transmission beamforming vectors for the first stream and the second stream.

6. The target transmitter of claim 1, wherein the rate splitting encoder is further configured to encode the first stream and the second stream to enable the neighbor receiver corresponding to the neighbor transmitter to decode:
- a common message of the first stream received in a first reception spatial dimension of the neighbor receiver; and
- a common message of the second stream received in a second reception spatial dimension of the neighbor receiver.

7. The target transmitter of claim 1, wherein the rate splitting scheme allows the target transmitter to separate a message to be transmitted into multiple partial messages.

8. The target transmitter of claim 7, wherein the multiple partial messages include a common message and a private message.

9. The target transmitter of claim 8, wherein the target transmitter is further configured to adjust a transmission power of the private message such that the first receiver decodes the private message and the second receiver does not decode the private message.

10. The target transmitter of claim 1, wherein a span of a product between a channel matrix from the target transmitter to the target receiver and transmission beamforming vectors of the first stream and a product between a channel matrix from the neighbor transmitter to the largest receiver and transmission beamforming vectors of the third stream is the same as a span of the first reception beamforming vector, and
- a span of a product between the channel matrix from the target transmitter to the target receiver and transmission beamforming vectors of the second stream and a product between the channel matrix from the neighbor transmitter to the target receiver and transmission beamforming vectors of the fourth stream is the same as a span of the second reception beamforming vector.

11. The target transmitter of claim 1, wherein the transmission beamforming vectors are designed based on the equations, $$\text{span}(w_1) = \text{span}[H_{11}v_1 H_{12}v_3]$$

$$\text{span}(w_2) = \text{span}[H_{11}v_2 H_{12}v_4]$$

$$\text{span}(w_3) = \text{span}[H_{22}v_3 H_{21}v_1]$$

$$\text{span}(w_4) = \text{span}[H_{22}v_4 H_{21}v_2],$$

wherein $w_1$ corresponds to the first reception beamforming vector of the target receiver, $w_2$ corresponds to the second reception beamforming vector of the target receiver, $w_3$ corresponds to the first reception beamforming vector of the neighbor receiver, $w_4$ corresponds to the second reception beamforming vector of the neighbor receiver, $H_{11}$ corresponds to a channel from the target transmitter to the target receiver, $H_{12}$ corresponds to a channel from the neighbor transmitter to the target receiver, $H_{22}$ corresponds to a channel from the neighbor transmitter to the neighbor receiver, $H_{21}$ corresponds to a channel from the target transmitter to the neighbor receiver, $v_1$ corresponds to a transmission beamforming vector for the first stream, $v_2$ corresponds to a transmission beamforming vector for the second stream, $v_3$ corresponds to a transmission beamforming vector for the third stream, $v_4$ corresponds to a transmission beamforming vector for the fourth stream.

12. The target transmitter of claim 1, wherein the target transmitter is configured to establish the rate splitting encoder in response to the aligning of the first stream and the third stream, and the aligning of the second stream and the fourth stream.

13. The target transmitter of claim 1, wherein the target transmitter is a first multi-antenna transmitter in a first cell, and the neighbor transmitter is a second multi-antenna transmitter in a second cell, the first cell being adjacent to the second cell.

14. A target receiver corresponding to a target transmitter, comprising:
- a reception beamformer configured to use reception beamforming vectors to:
  - remove, in a first reception spatial dimension, components of a second stream and a fourth stream included in a signal received by the target receiver; and
  - remove, in a second reception spatial dimension, components of a first stream and a third stream included in the signal received by the target receiver, the first stream and the second stream being transmitted by the target transmitter, and the third stream and the fourth stream being transmitted by a neighbor transmitter of the target transmitter, wherein
  - the first stream and the third stream are aligned without aligning the second stream and the fourth stream by applying a span of a first reception beamforming vector; and
  - the second stream and the fourth stream are aligned without aligning the first stream and the third stream by applying a span of a second reception beamforming vector; and
- a rate splitting decoder configured to
- decode the first stream and
- the second stream.

15. The target receiver of claim 14, wherein the reception beamformer uses reception beamforming vectors generated based on channel information between the target transmitter and the target receiver and channel information between the neighbor transmitter and the target receiver to remove, in the first reception spatial dimension, components of the second stream and the fourth stream from the signal received by the target receiver and to remove, in the second reception spatial dimension, components of the first stream and the third stream from the signal received by the target receiver.

16. The target receiver of claim 14, wherein the reception beamforming vectors are generated based on:
- transmission beamforming vectors of the target transmitter; and
- transmission beamforming vectors of the neighbor transmitter.

17. The target receiver of claim 14, wherein the reception beamforming vectors are linearly independent.

18. The target receiver of claim 14, wherein the rate splitting decoder is further configured to:
- decode the decodable common message of the third stream to remove the decodable common message of the third stream; and
- decode the decodable common message of the fourth stream to remove the decodable common message of the fourth stream.

19. The target receiver of claim 14, wherein a span of a product between a channel matrix from the largest transmitter to the target receiver and transmission beamforming vectors of the first stream and a product between a channel matrix from the neighbor transmitter to the target receiver and transmission beamforming vectors of the third stream is the same as a span of the first reception beamforming vector, and a span of a product between the channel matrix from the target transmitter to the target receiver and transmission beamforming vectors for the second stream and a product between the channel matrix from the neighbor transmitter to the target receiver and transmission beamforming vectors of the fourth stream is the same as a span of the second reception beamforming vector.

20. The target receiver of claim 14, wherein the reception beamforming vectors are designed based on the equations, $$\text{span}(w_1) = \text{span}[H_{11}v_1 H_{12}v_3]$$

$$\text{span}(w_2) = \text{span}[H_{11}v_2 H_{12}v_4]$$

$$\text{span}(w_3) = \text{span}[H_{22}v_3 H_{21}v_1]$$

$$\text{span}(w_4) = \text{span}[H_{22}v_4 H_{21}v_2],$$

wherein $w_1$ corresponds to the first reception beamforming vector of the target receiver, $w_2$ corresponds to the second reception beamforming vector of the target receiver, $w_3$ corresponds to the first reception beamforming vector of the neighbor receiver, $w_4$ corresponds to the second reception of the neighbor receiver, $H_{11}$ corresponds to a channel from the target transmitter to the target receiver, $H_{12}$ corresponds to a channel from the neighbor transmitter to the target receiver, $H_{22}$ corresponds to a channel from the neighbor transmitter to the neighbor receiver, $H_{21}$ corresponds to a channel from the target transmitter to the neighbor receiver, $v_1$ corresponds to a transmission beamforming vector for the first stream, $v_2$ corresponds to a transmission beamforming vector for the second stream, $v_3$ corresponds to a transmission beamforming vector for the third stream, $v_4$ corresponds to a transmission beamforming vector for the fourth stream.

21. The target receiver of claim 14, wherein the target transmitter is a first multi-antenna transmitter in a first cell, and the neighbor transmitter is a second multi-antenna transmitter in a second cell, the first cell being adjacent to the second cell.

* * * * *